(12) United States Patent
Liu

(10) Patent No.: US 7,534,001 B2
(45) Date of Patent: May 19, 2009

(54) LIGHT-GUIDING METHOD OF LIGHT-GUIDING PLATE AND KEY PAD ASSEMBLY USING THE LIGHT-GUIDING PLATE

(75) Inventor: Chang-Li Liu, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 49 days.

(21) Appl. No.: 11/683,085

(22) Filed: Mar. 7, 2007

(65) Prior Publication Data
US 2008/0218991 A1  Sep. 11, 2008

(51) Int. Cl.
*H04M 1/22* (2006.01)
(52) U.S. Cl. .............................. 362/24; 362/86; 362/627
(58) Field of Classification Search ................... 362/24, 362/26, 27, 85, 86, 88, 612, 613, 619, 627; 200/310, 313, 314; 345/170, 176
See application file for complete search history.

(56) References Cited

U.S. PATENT DOCUMENTS

| | | | | |
|---|---|---|---|---|
| 4,646,206 A | * | 2/1987 | Bauer et al. | 362/26 |
| 5,975,711 A | * | 11/1999 | Parker et al. | 362/24 |
| 6,422,712 B1 | | 7/2002 | Nousiainen et al. | |
| 6,854,855 B2 | | 2/2005 | Munro et al. | |
| 7,086,768 B2 | * | 8/2006 | Suwa et al. | 362/85 |
| 7,429,709 B2 | * | 9/2008 | Kim | 200/310 |
| 2006/0120110 A1 | | 6/2006 | Lin et al. | |
| 2006/0254894 A1 | | 11/2006 | Jung et al. | |
| 2008/0062670 A1 | * | 3/2008 | Hong | 362/26 |

\* cited by examiner

*Primary Examiner*—Y My Quach Lee

(57) ABSTRACT

A key pad assembly includes a printed circuit board, a first elastic layer, a second elastic layer, a light-shielding layer, a keycap group, a light-emitting element and a light-shielding piece. The second elastic layer has a light-guiding plate thereon. The light-guiding plate has a chain-like light-shielding structure. The light-shielding structure is constituted of a plurality of penetrating holes with neighboring ones arranged alternatively and divides the light-guiding plate into two light-guiding sections. When the lights with different colors are introduced from the outside of the two light-guiding sections into the light-guiding plate, and the light of either light-guiding section passes through the light-shielding structure, the intensity of the light passing through the penetrating hole is so reduced that it cannot achieve the other light-guiding section, thereby to avoid the mutual interference and mixing of the lights of the two light-guiding sections.

29 Claims, 10 Drawing Sheets

LIGHT-GUIDING METHOD OF LIGHT-GUIDING PLATE AND KEY PAD ASSEMBLY USING THE LIGHT-GUIDING PLATE

BACKGROUND OF THE INVENTION

1. Field of the Invention

The present invention relates to a keycap, and in particular to a light-guiding method and a light-guiding assembly of a backlight source within the keycap.

2. Description of Prior Art

Back light source can be widely used in a liquid crystal display, a signboard or an advertisement board. In addition, it can be also applied to electronic products, such as mobile phone or personal digital assistant. Since the back light module is mounted within the keycap, the user can still smoothly operate the keycaps even in the night or without the illumination of a light source.

The conventional keycap is provided with a light-guiding plate in the interior of the key pad assembly, and the periphery or the bottom of the light-guiding plate is provided with a light-emitting diode. When the electronic product is in use, the light-emitting diode is lighted up, and the light is introduced into the light-guiding plate. At this time, with the light-guiding plate, the light is directed to the keycap above the light-guiding plate, so that the surface of the keycap has a light-transmitting effect. In this way, the user can clearly see the character, numeral or symbol on the surface of each keycap.

Recently, with the development of multi-color light-emitting diodes, they are also widely used in the keycaps of electronic products. The multi-color light-emitting diode generates the lights with various colors under the control of the circuit of the electronic product to, so that the surface of the keycap or some keycap groups can represent a colored back light effect with different colors. Since there is only one layer of light-guiding plate, if several multi-color light-emitting diodes are lighted up at the same time, and the lights with various colors are simultaneously introduced into the light-guiding plate, these lights may be mutually interfered with one another or mixed easily. As a result, the light displayed on the surface of the keycap is not the originally preset light. Therefore, in order to solve the mutual interference or mixing of the lights, adhesion of black patches or coating of inks is applied to the light-guiding plate so as to shield the light. After several multi-color lights are introduced into the light-guiding plate, the surface of the keycap or some keycap groups may represent a backlight effect with various colors and do not generate the interference or mixing of the lights. However, if the adhesion or coating process is not perfectly performed, such light-shielding measure may cause the leakage of light and in turn the waste of time and process in manufacturing the light-guiding plate.

SUMMARY OF THE INVENTION

Therefore, the present invention is characterized in that a light-shielding structure is provided on the light-guiding plate. With the light-shielding structure, the intensity of the light passing through the light-shielding structure is reduced, thereby to avoid the mutual interference or mixing of the lights.

In order to achieve the above object, the light-guiding plate of the present invention is provided with a chain-like light-shielding structure. The light-shielding structure has a plurality of penetrating holes with neighboring ones arranged alternatively and divides the light-guiding plate into two light-guiding sections. After the lights with different colors are introduced from the exterior of the two light-guiding sections into the light-guiding plate, when the light of either light-guiding section passes through the light-shielding structure, the intensity of the light passing through the penetrating hole will be reduced and thus the light cannot achieve the other light-guiding section, thereby to avoid the mutual interference and mixing of the lights of two light-guiding sections.

DETAILED DESCRIPTION OF THE INVENTION

The technical contents and the detailed description of the present invention will be made with reference to the accompanying drawings.

Figure 1:
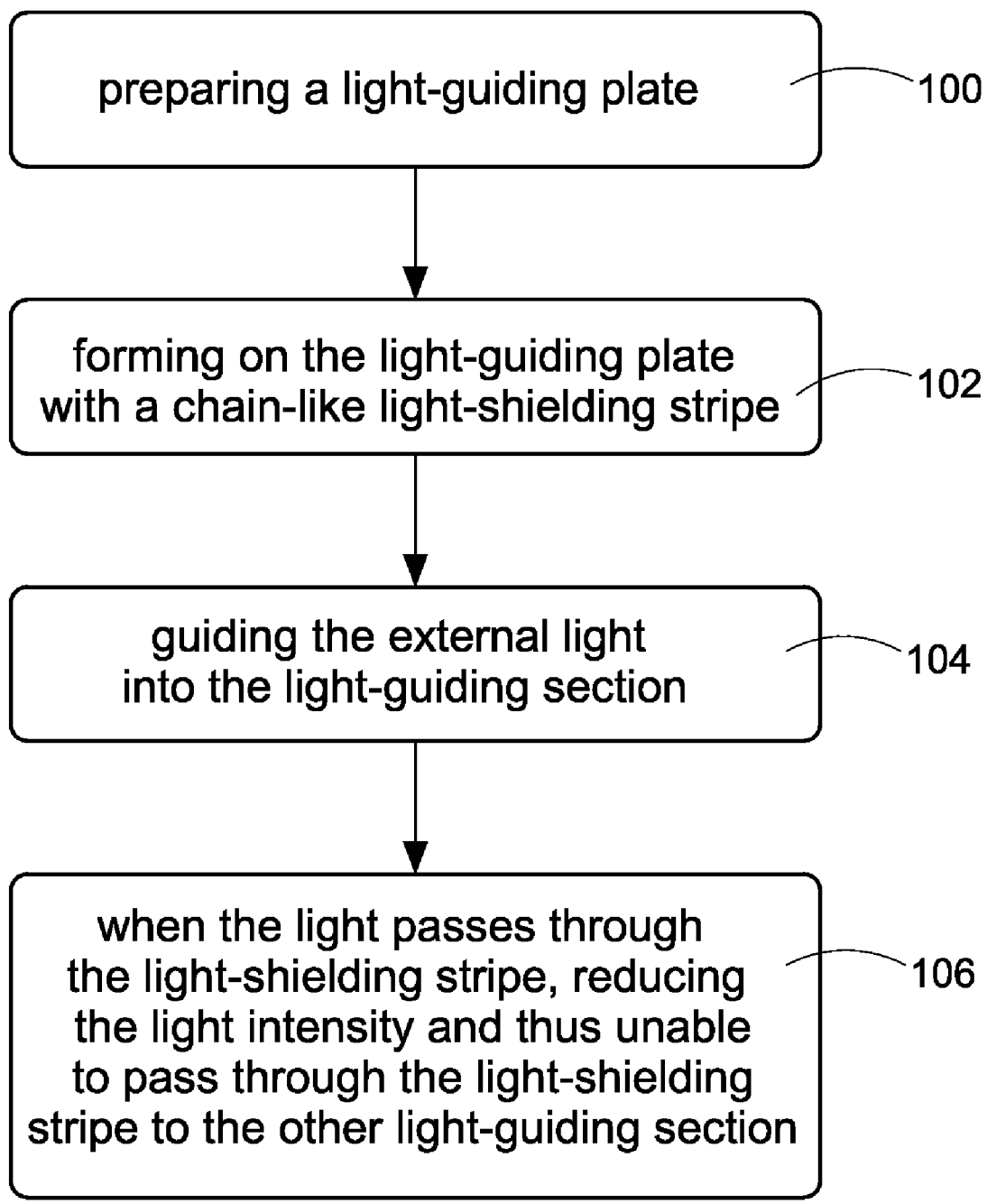
FIG. 1 is a flow chart showing the light-guiding method of the light-guiding plate of the present invention.

FIG. 1 is a flow chart showing the light-guiding method of the light-guiding plate of the present invention. This figure shows the light-guiding method of the light-guiding plate. First of all, in step 100, a light-guiding plate is prepared. The light-guiding plate is formed thereon with a block-like light-guiding portion, a frame-like light-guiding portion and a stripe-like light-guiding portion.

In step 102, the light-guiding plate is formed with a chain-like light-shielding structure for dividing the light-guiding plate into two light-guiding sections. The light-shielding structure is constituted of a plurality of adjacent penetrating holes arranged alternatively.

In step 104, when the light-emitting element in the outside of either light-guiding section is lighted up, the light is introduced into the light-guiding section.

In step 106, when the light passes through the penetrating holes of the light-shielding structure, the traveling path of the light will be refracted on the neighboring penetrating hole by the penetrating hole, so that the light intensity is reduced and cannot pass through the penetrating hole to the other light-guiding section. In this way, the specific light sources generated by the two light-guiding sections will not be mutually interfered or mixed.

Figure 2:
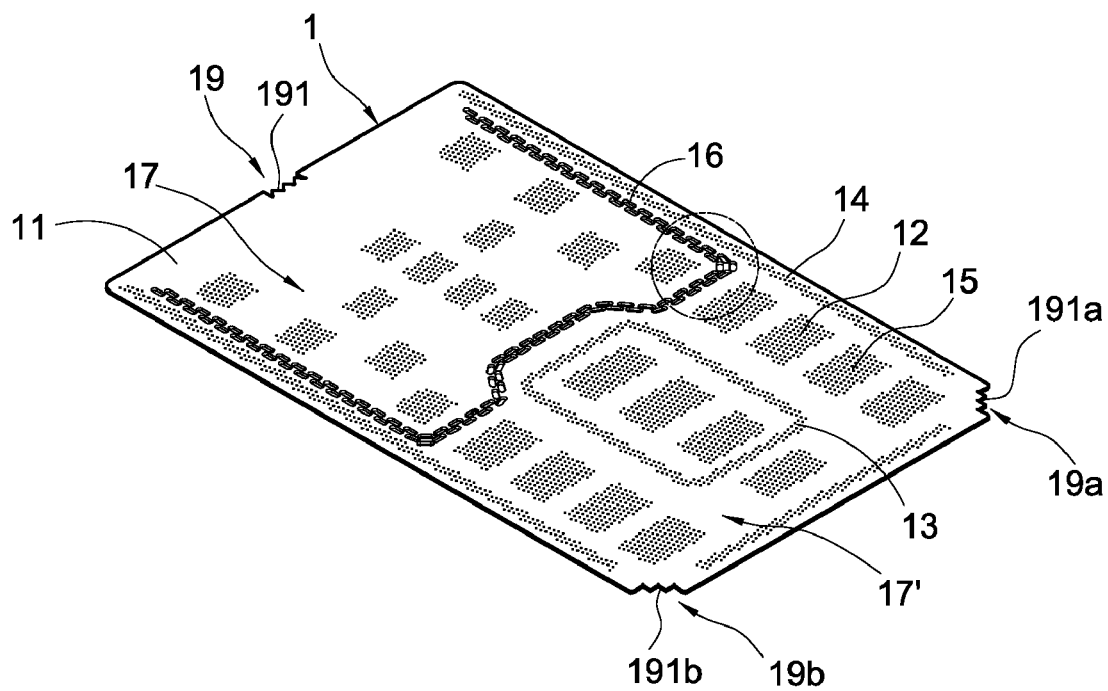
FIG. 2 is a perspective view showing the external appearance of the light-guiding plate of the present invention.
Figure 3:
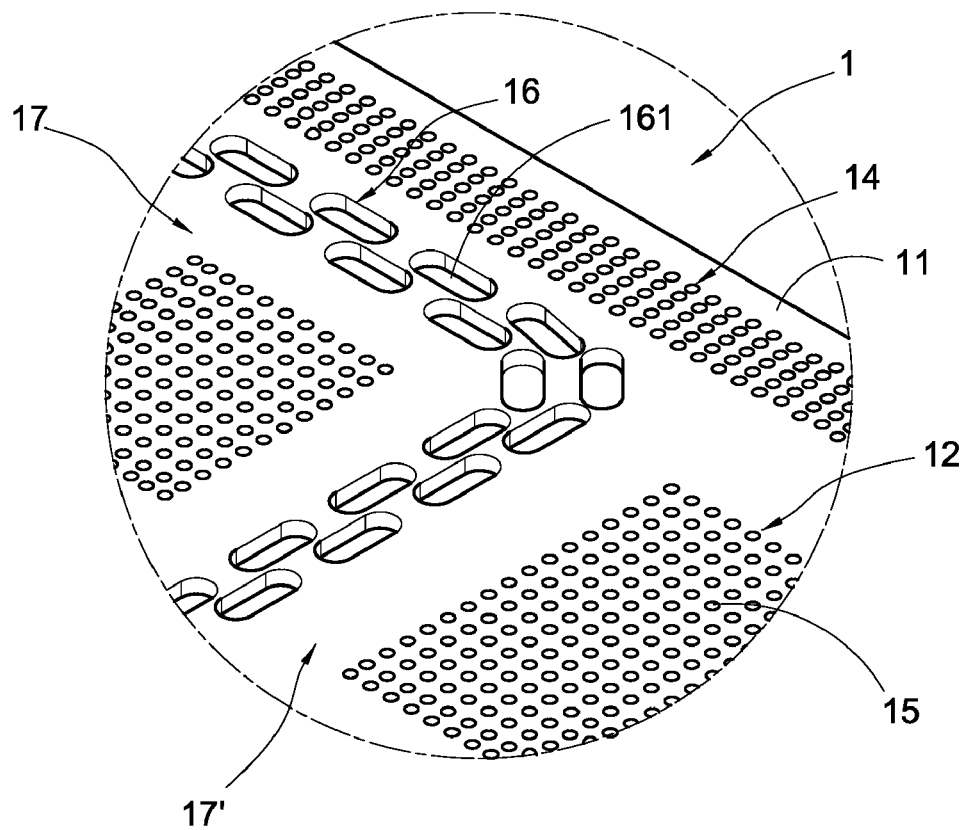
FIG. 3 is a partially enlarged view of FIG. 2.

FIG. 2 is a perspective view showing the external appearance of the light-guiding plate of the present invention, and FIG. 3 is a partially enlarged view of FIG. 2. As shown in these figures, the light-guiding plate 1 is a transparent carrier 11 made of either PC film or TPU film. The carrier 11 is formed thereon with block-like light-guiding portions 12, frame-like light-guiding portions 13 and strip-like light-guiding portions 14. The block-like light-guiding portion 12 is used to guide the light to a corresponding keycap. The frame-like light-guiding portion 13 is used to guide the light to a specific keycap group. The strip-like light-guiding portion 14 is used to guide the light to the side edge of the carrier 11.

The above-mentioned block-like light-guiding portion 12, frame-like light-guiding portion 13 and strip-like light-guiding portion 14 are constituted of a plurality of light-guiding microstructures 15. After the external light is introduced into carrier 11, the light-guiding microstructures 15 change the traveling path of the light, so that the light can be condensed and projected on the keycap.

Figure 4:
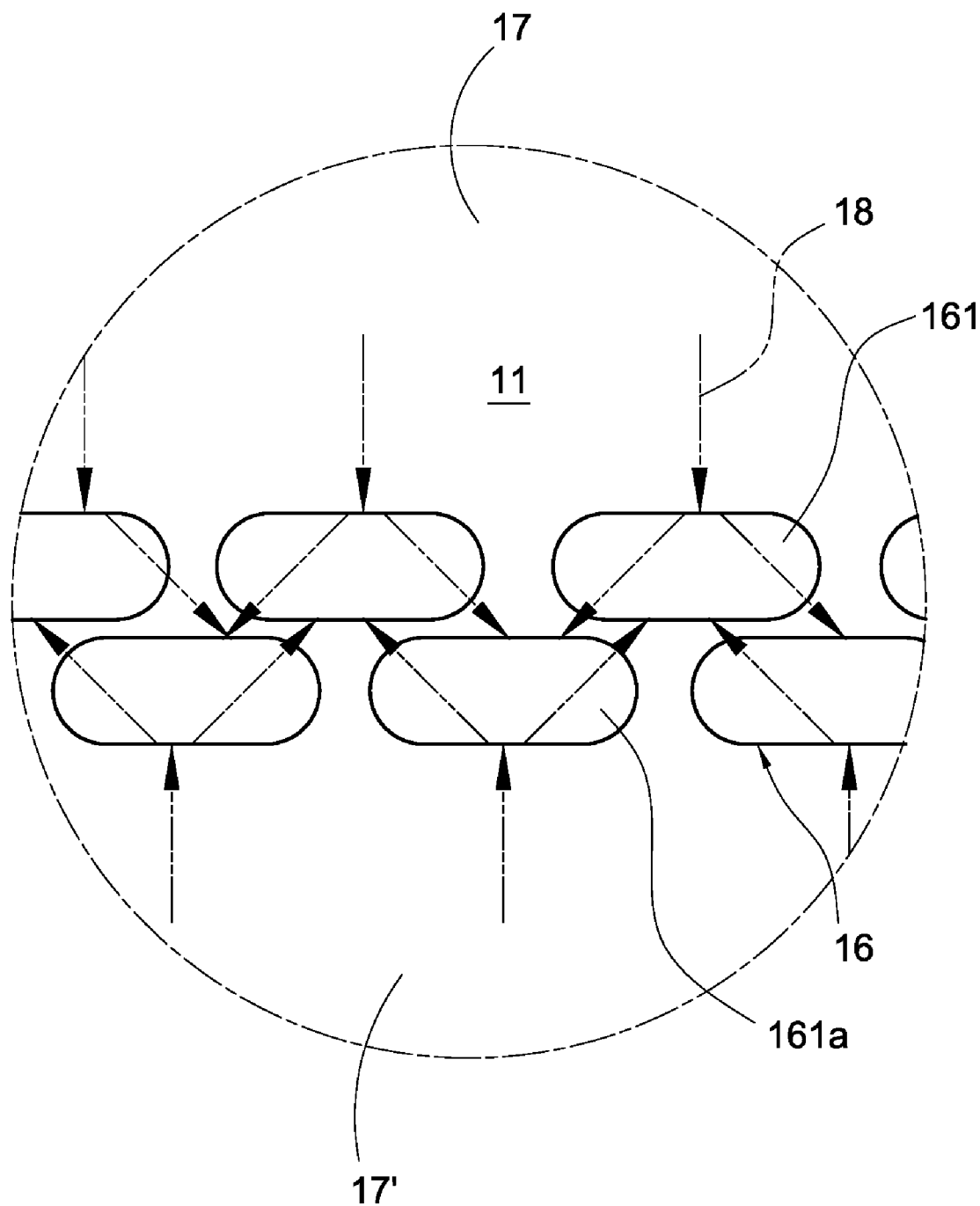
FIG. 4 is a schematic view of the light-shielding principle of the light-guiding plate of the present invention.

With reference to FIG. 4, a chain-like light-shielding structure 16 is provided among the block-like light-guiding portion 12, the frame-like light-guiding portion 13 and the strip-like light-guiding portion 14, thereby to divide the carrier 11 into two light-guiding sections 17, 17'. The light-shielding structure 16 is formed of a plurality of penetrating holes 161 with the neighboring ones arranged alternatively. After the external light 18 is introduced into the carrier 11 by either light-guiding section 17, 17', when the light 18 passes through the penetrating hole 161 of the light-shielding structure 16, the light 18 will be refracted on the neighboring penetrating holes 161a by the penetrating hole 161, so that the light is reduced and cannot pass through the light-shielding structure 16. Therefore, when the lights 18 are introduced via the two light-guiding sections 17, 17', the mutual interference or mixing of the lights cannot be occurred.

Figure 5:
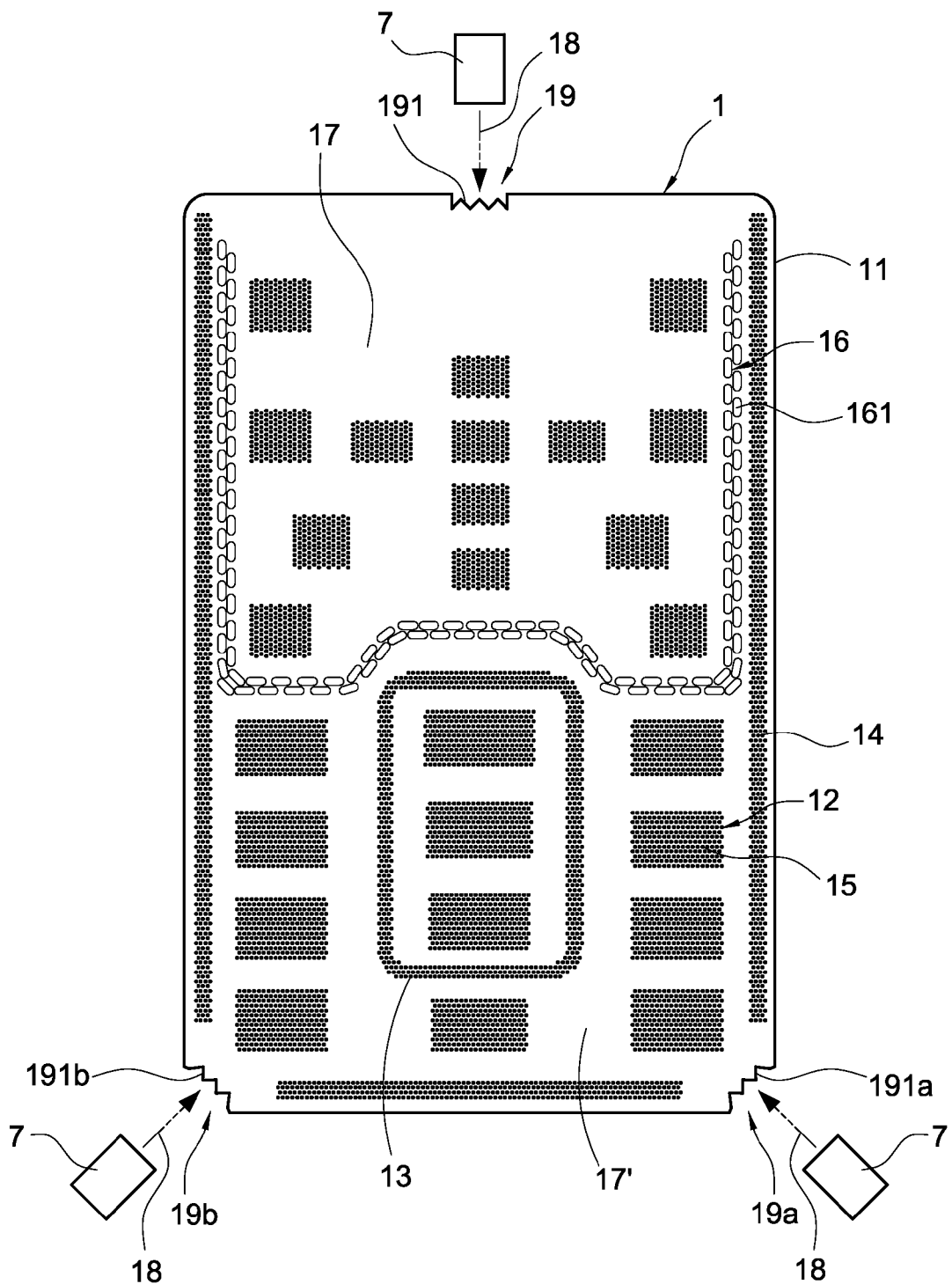
FIG. 5 is a top view of the light-guiding plate of the present invention.

With reference to FIG. 5, one side and two corners of the carrier 11 of the light-guiding plate 1 are each provided with a notch 19, 19a and 19b. A stepped light-refracting portion 191, 191a and 191b is provided within the notch 19, 19a and 19b, respectively. A light-emitting element 7 is disposed on the notch 19, 19a and 19b. When the light-emitting element 7 is lighted up, the thus-generated light 18 is introduced via the light-refracting portion 191, 191a and 191b, so that the light can be rapidly and uniformly diffused onto the two light-guiding sections 17, 17' of the carrier 11.

Figure 6:
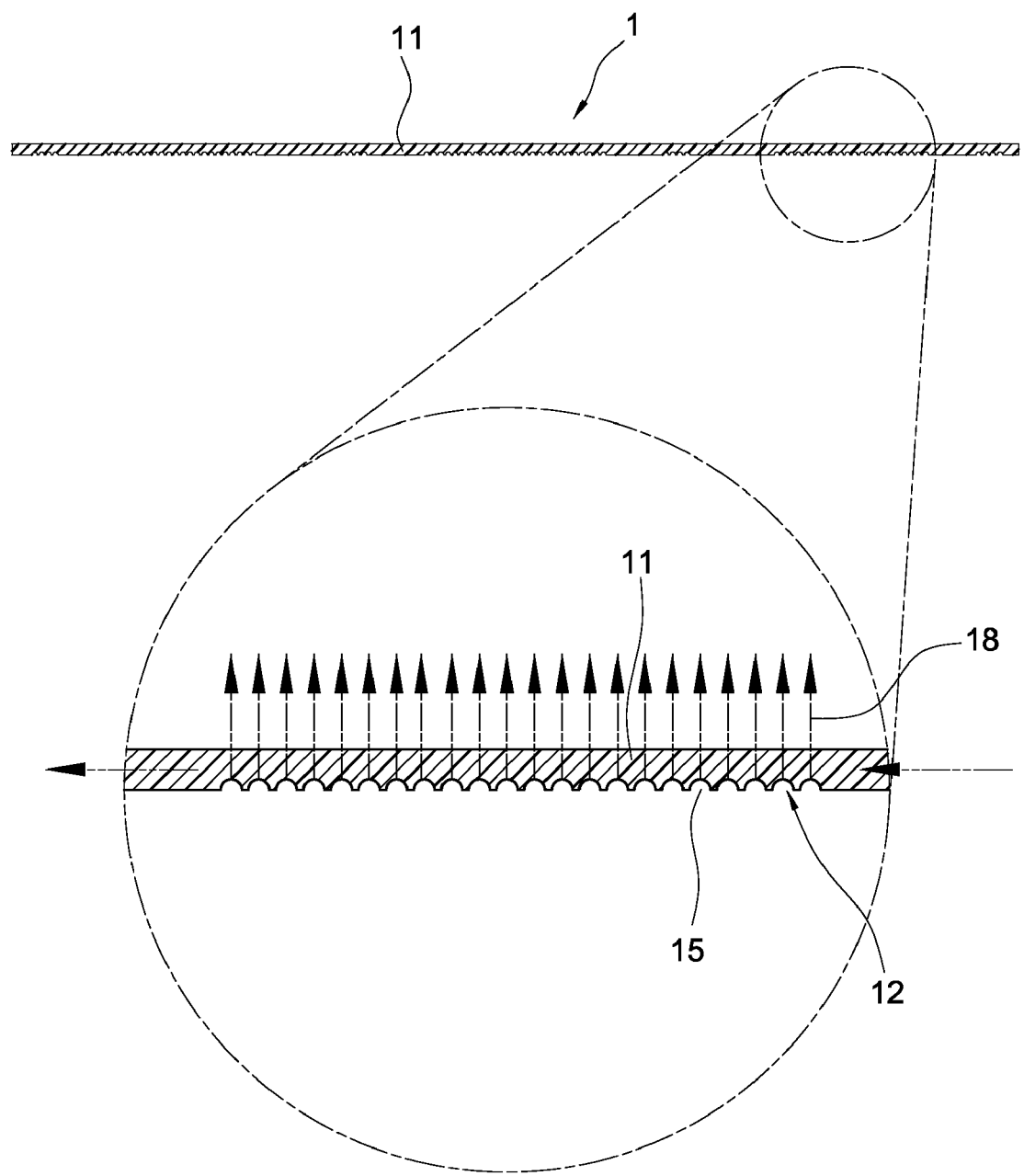
FIG. 6 is a side view of the light-guiding plate of the present invention.

With reference to FIG. 6, the light-guiding microstructures 15 on the light-guiding plate 1 are each formed into a semicircular pit. When the external light 18 is introduced into the carrier 11 of the light-guiding plate 1, and the light 18 passes through the light-guiding microstructure 15, the light-guiding microstructure 15 changes the traveling path of the light 18, so that the light 18 can be condensed and projected on the keycap.

Figure 7:
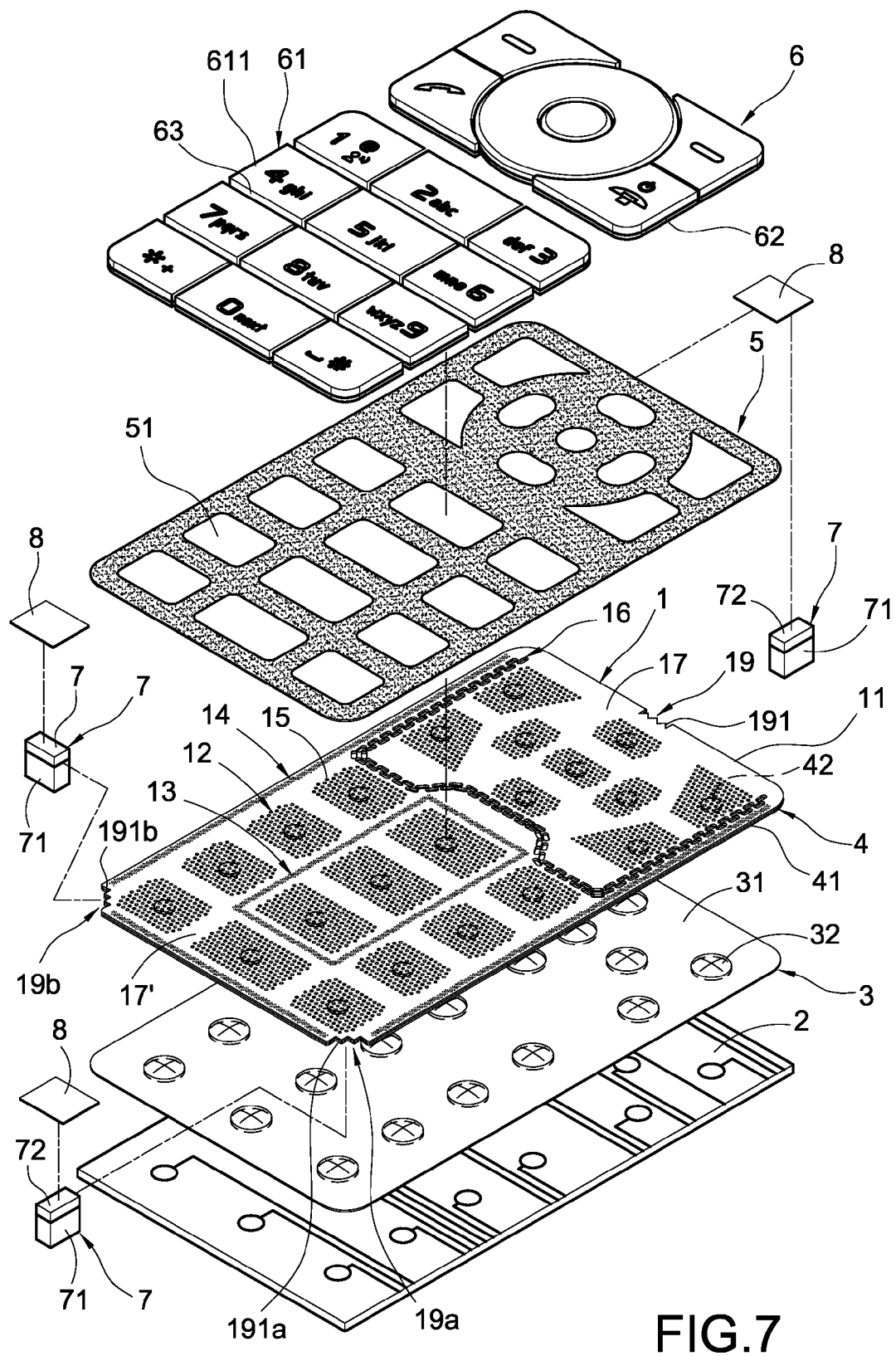
FIG. 7 is a schematic view showing the combination of the light-guiding plate of the present invention with a key pad assembly.

With reference to FIG. 7, it is a schematic view showing the combination of the light-guiding plate of the present invention with a key pad assembly. This figure shows a kind of key pad assembly comprising a printed circuit board 2, a first elastic layer 3, a second elastic layer 4, a light-shielding layer 5, a keycap group 6, a light-emitting element 7 and a light-shielding piece 8.

The above-mentioned printed circuit board 2 is a thin film printed circuit board printed with a circuit thereon.

The first elastic layer 3 is disposed on the printed circuit board 2 and has a thin film elastic piece 31 made of a hard PC material and a metal dome 32 adhered on the thin film elastic piece 31 and disposed to correspond to the printed circuit board 2. When the metal dome 32 is pressed and deformed, it generates a crack sound, so that the user can feel the keycap 61 is pressed.

The second elastic layer 4 is disposed on the first elastic layer 3 and constituted of a light-guiding plate 1 and an elastic body 41. The elastic body 41 is made of a soft PC material and combined with the light-guiding plate 1 via a thermal press technology. The elastic body 41 is formed thereon with a plurality of protrusion bodies 42. The protrusion body 42 is disposed to correspond to the metal dome 32.

The light-shielding layer 5 is provided on the second elastic layer 4. The light-shielding layer 5 is formed into a hollowed hole 51 at the position corresponding to the light-guiding microstructure 15. The gap 63 formed between the neighboring keycaps 61 is located on the light-shielding layer 5, thereby to prevent the mutual interference of the light.

The keycap group 6 is constituted of a plurality of keycaps 61. Each keycap 61 is made of a light-transmitting material and has a numeral, character or symbol on the surface thereof. The bottom of the keycap group is provided with an adhesive layer 62. The adhesive layer 62 allows the keycaps 61 to be adhered on the light-shielding layer 5 and the gap 63 formed between the neighboring keycaps 61 is located on the light-shielding layer 5, so that the light-shielding layer 5 can prevent the leakage of the light via the gap, thereby to improve the light-transmitting effect of the surface 611 of the keycap 61.

The light-emitting element 7 is a light-emitting diode that emits light laterally, and has a base 71 thereon. The base 71 has a light-emitting portion 72 disposed on one side of the second elastic layer 4.

The light-shielding layer 8 is located above the light-emitting element 7 and the second elastic layer 4, thereby to prevent the leakage of the light. In this way, the light can be condensed and guided in the light-guiding plate 1.

Figure 8:
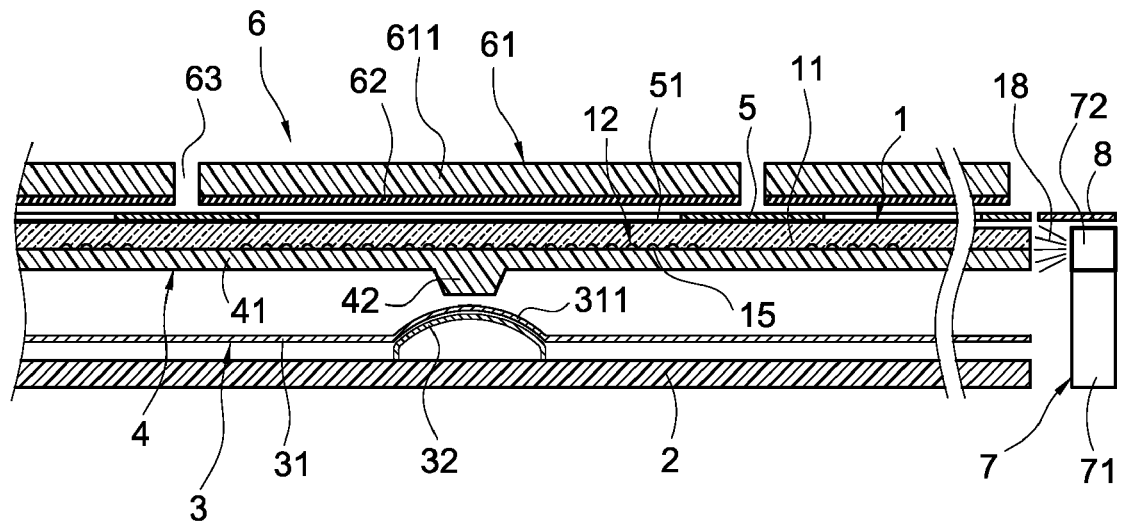
FIG. 8 is a side view of FIG. 7.
Figure 9:
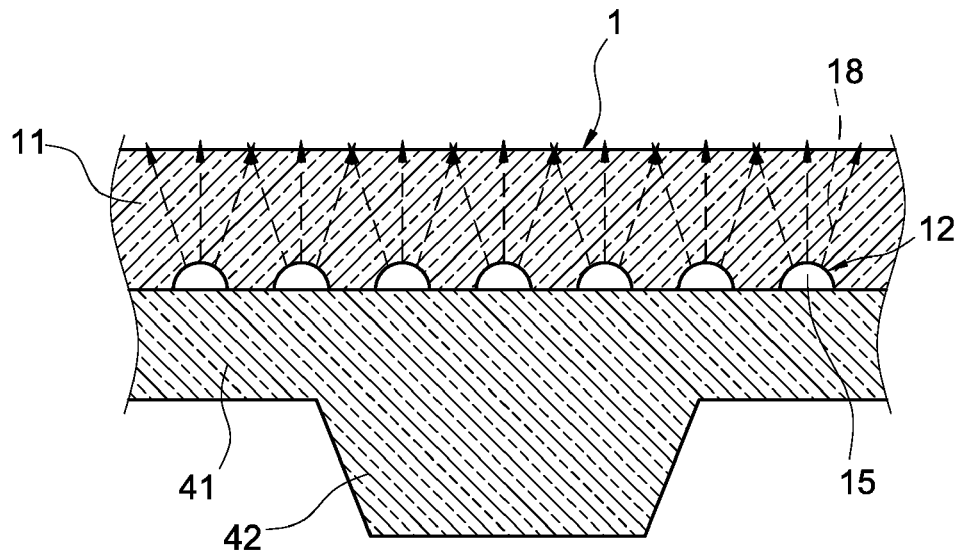
FIG. 9 is a schematic view showing the optical path in FIG. 7.

FIG. 8 is a side view of FIG. 7, and FIG. 9 is a schematic view showing the optical path in FIG. 7. As shown in these figures, after the light 18 generated by the light-emitting portion 72 of the light-emitting element 7 enters the light-guiding plate 1, and the light 18 passes through the light-guiding microstructure 15, the light-guiding microstructure 15 refracts the light to project upwardly. Then, the refracted light passes through the hollowed holes 51 of the light-shielding layer 5, so that the light 18 can be projected on the keycap group 6. In this way, the surface 611 of each keycap 61 can have a light-transmitting effect to clearly display the numeral, character or symbol on the surface 611 of the keycap 61.

Meanwhile, when the keycap 61 is pressed under the external force, the protrusion body 42 of the second elastic layer 4 is pressed onto the surface 311 of the thin film elastic piece 31 of the first elastic layer 3, so that the metal dome 32 is deformed to press on the printed circuit board 2. As a result, the printed circuit board 2 generates a signal transmission. During the period of pressing the keycap 61, the metal dome 32 generates a crack sound, so that the user can feel the keycap 61 is pressed.

Figure 10:
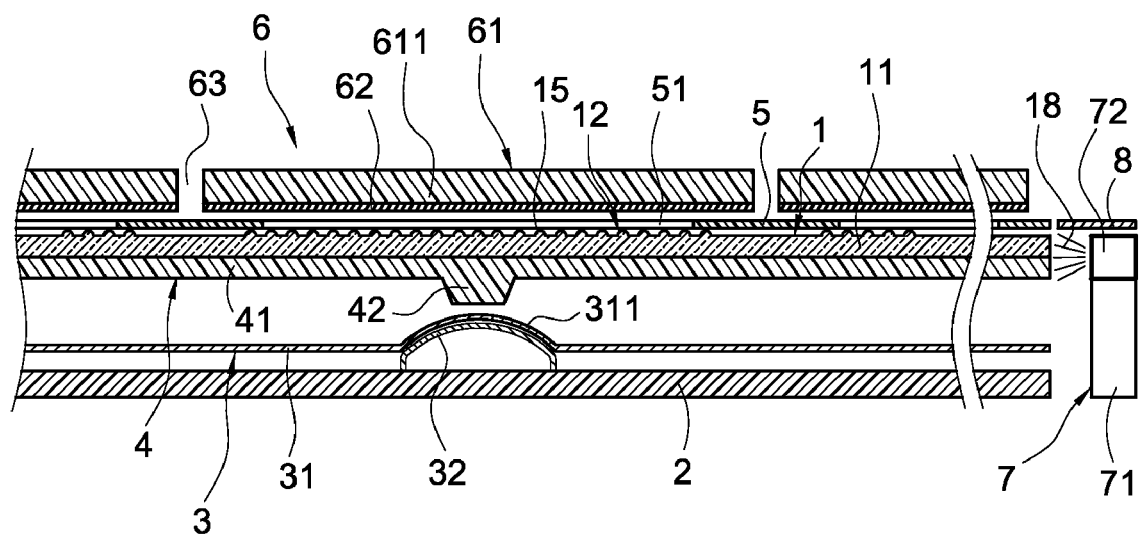
FIG. 10 is a side view of another embodiment of the present invention.

FIG. 10 is a side view of another embodiment of the present invention. The key pad assembly shown in this figure is substantially the same as that shown in FIGS. 7 and 8. The only difference is in that the light-guiding microstructure 15 of the light-guiding plate 1 is a semicircular bump projecting from the surface of the light-guiding plate 1. After the light 18 is introduced via the light-guiding plate 1, the light-guiding microstructure 15 condenses the light to project upwardly. The light then passes through the hollowed hole 51 of the light-shielding layer 5, so that the light 18 can be projected on the keycap group 6. In this way, the surface 611 of each keycap 61 can have a light-transmitting effect to clearly display the numeral, character or symbol on the surface 611 of the keycap 61.

Figure 11:
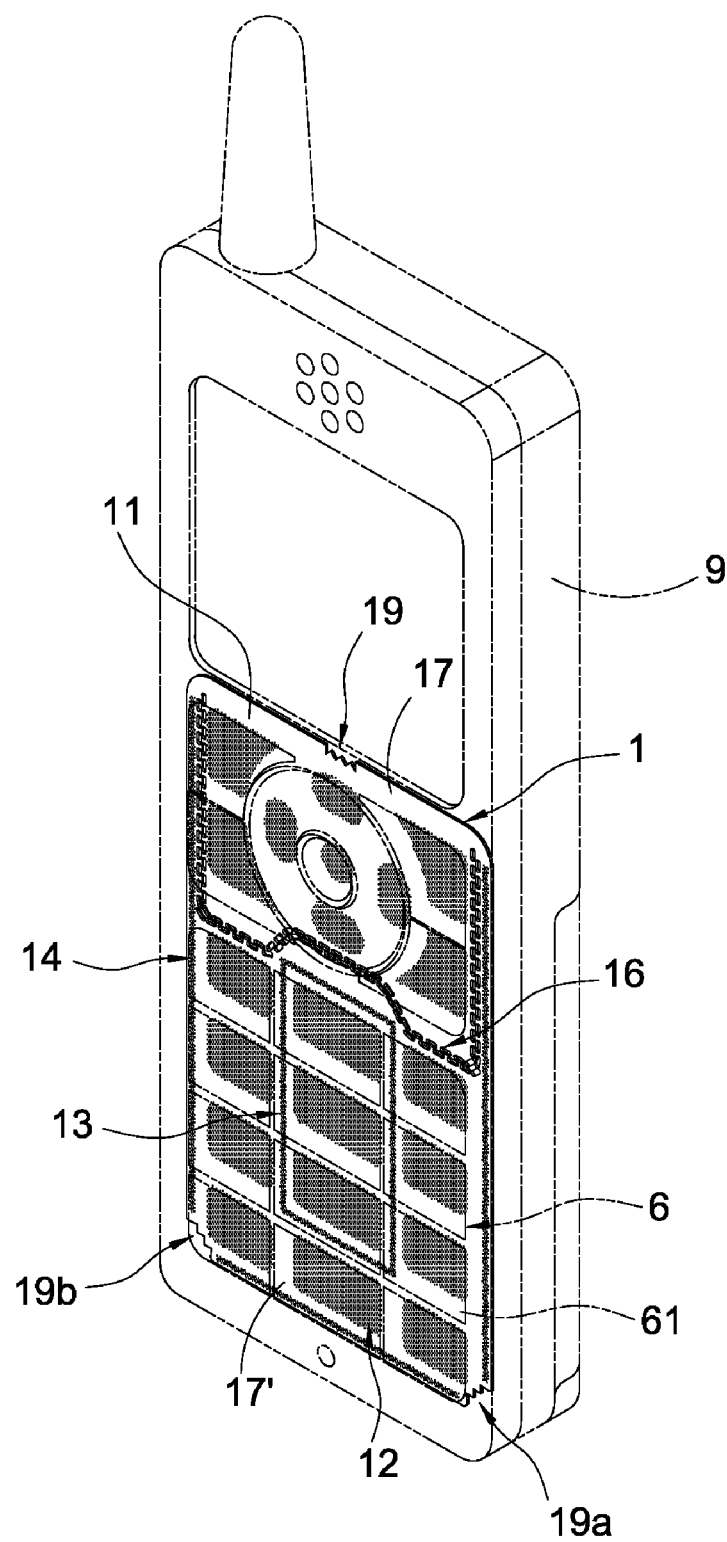
FIG. 11 is a schematic view showing that the light-guiding plate of the present invention is applied to a mobile phone.

FIG. 11 is a schematic view showing that the light-guiding plate of the present invention is applied to a mobile phone. As shown in the figure, the light-guiding plate 1 of the present invention is disposed within the key pad assembly of a mobile phone 9. When the mobile phone 9 is in use, the light is introduced via the light-guiding plate 1. After the light passes through the light-shielding structure 16, the light is reduced and cannot pass through the light-shielding structure 16. Therefore, the individual keycaps 61 in the two light-guiding sections 17, 17' will represent a backlight effect with different colors.

If the light introduced via the light-guiding section 17 is red, and the light introduced via the light-guiding section 17' is green, it can be clearly seen on the keycap panel of the mobile phone 9 that the keycaps 61 above the light-shielding structure 16 represent a red color while the keycaps 61 below the light-shielding structure 16 represent a green color. In this way, some keycap groups of the mobile phone 9 generate a predetermined color, so that the user will not press the wrong keycaps during the operation (such as playing games).

Figure 12:
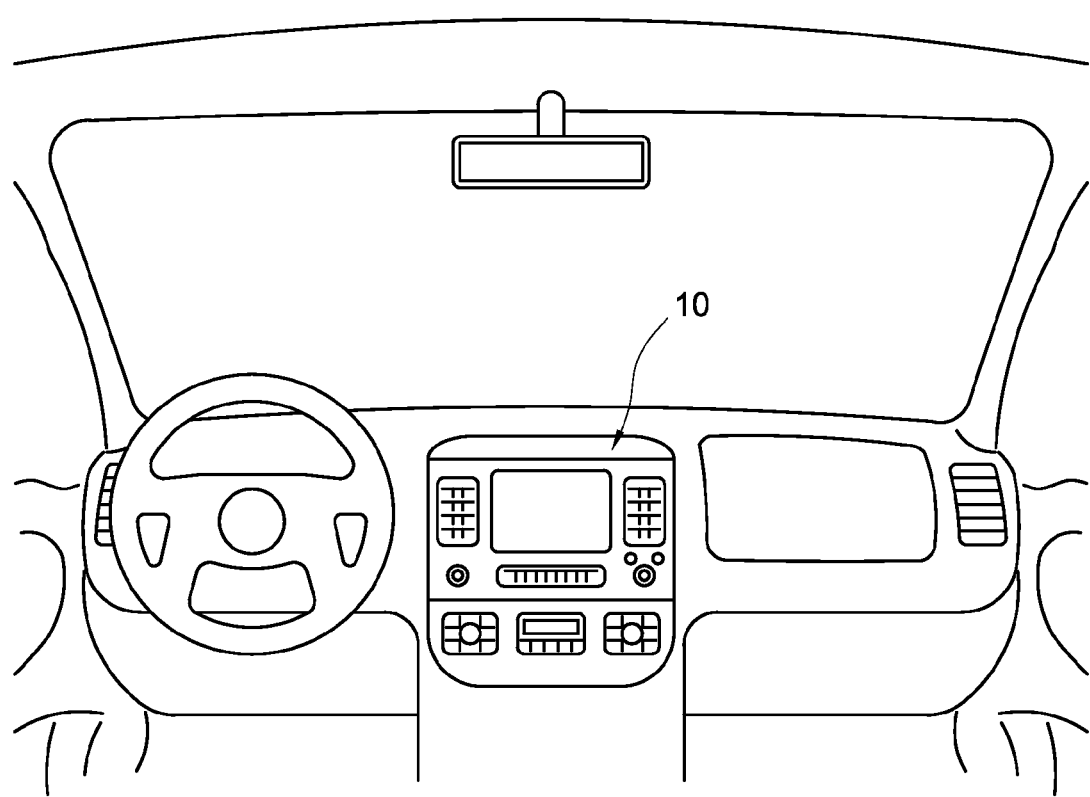
FIG. 12 is a schematic view showing that the key pad assembly of the present invention is applied to an automobile stereo panel.

FIG. 12 is a schematic view showing that the key pad assembly of the present invention is applied to an automobile stereo panel. As shown in this figure, in addition to the mobile phone, the panel of the key pad assembly of the present invention can be also mounted on an automobile stereo panel 10, thereby to control the air-conditioning system, the AV system and the satellite navigation system.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A light-guiding plate assembly within a keycap, having a carrier, the carrier having block-like light-guiding portions, frame-like light-guiding portions and stripe-like light-guiding portions, a light-shielding structure provided among the block-like light-guiding portion, the frame-like light-guiding portion and the stripe-like light-guiding portion to divide the carrier into two light-guiding sections, wherein the carrier is made of a transparent PC film or TPU film.

2. The light-guiding plate assembly within a keycap according to claim 1, wherein the block-like light-guiding portion directs the light to a corresponding keycap.

3. The light-guiding plate assembly within a keycap according to claim 1, wherein the frame-like light-guiding portion directs the light to a specific keycap group.

4. The light-guiding plate assembly within a keycap according to claim 1, wherein the strip-like light-guiding portion directs the light to a side edge of the carrier.

5. The light-guiding plate assembly within a keycap according to claim 1, wherein each of the block-like, the frame-like and the stripe-like light-guiding portions is constituted of a plurality of light-guiding microstructures.

6. The light-guiding plate assembly within a keycap according to claim 5, wherein the light-guiding microstructure is a semicircular pit or a bump projecting from a surface of the carrier.

7. The light-guiding plate assembly within a keycap according to claim 1, wherein one side and two corners of the carrier are each provided with a notch thereon.

8. The light-guiding plate assembly within a keycap according to claim 7, wherein the notch is provided therein with a stepped light-refracting portion.

9. The light-guiding plate assembly within a keycap according to claim 7, wherein the notch is disposed a light-emitting element thereon.

10. A light-guiding plate assembly within a keycap, having a carrier, the carrier having block-like light-guiding portions, frame-like light-guiding portions and stripe-like light-guiding portions, a light-shielding structure provided among the block-like light-guiding portion, the frame-like light-guiding portion and the stripe-like light-guiding portion to divide the carrier into two light-guiding sections, wherein the light-shielding structure is formed into a chain.

11. The light-guiding plate assembly within a keycap according to claim 10, wherein the chain-like light-shielding structure is constituted of a plurality of penetrating holes with neighboring ones arranged alternatively.

12. A key pad assembly, comprising:

a printed circuit board;

a first elastic layer disposed on the printed circuit board and having a thin film elastic piece and a metal dome adhered on the thin film elastic piece and disposed to correspond to the printed circuit board;

a second elastic layer disposed on the first elastic layer and constituted of a light-guiding plate and an elastic body, the light-guiding plate having a carrier thereon, the carrier having block-like light-guiding portions, frame-like light-guiding portions and stripe-like light-guiding portions, a light-shielding structure provided among the block-like light-guiding portion, the frame-like light-guiding portion and the stripe-like light-guiding portion to divide the carrier into two light-guiding sections; the elastic body formed with a plurality of protrusion bodies disposed to correspond to the metal dome;

a light-shielding layer provided on the second elastic layer, the light-shielding layer formed into a hollowed hole at the position corresponding to the block-like light-guiding portion; and a keycap group, provided on the light-shielding layer, constituted of a plurality of keycaps, a surface of the keycap having a light-transmitting numeral, character or symbol.

13. The key pad assembly according to claim 12, wherein the printed circuit board is a thin film printed circuit board.

14. The key pad assembly according to claim 12, wherein the thin film elastic piece is made of a hard PC material.

15. The key pad assembly according to claim 12, wherein the carrier is made of a transparent PC film or TPU film.

16. The key pad assembly according to claim 12, wherein the block-like light-guiding portion directs the light to a corresponding keycap.

17. The key pad assembly according to claim 12, wherein the frame-like light-guiding portion directs the light to a specific keycap group.

18. The key pad assembly according to claim 12, wherein the strip-like light-guiding portion directs the light to a side edge of the carrier.

19. The key pad assembly according to claim 12, wherein each of the block-like, the frame-like and the stripe-like light-guiding portions is constituted of a plurality of light-guiding microstructures.

20. The key pad assembly according to claim 19, wherein the light-guiding microstructure is a semicircular pit or a bump projecting from a surface of the carrier.

21. The key pad assembly according to claim 12, wherein the light-shielding structure is formed into a chain.

22. The key pad assembly according to claim 21, wherein the chain-like light-shielding structure is constituted of a plurality of penetrating holes with neighboring ones arranged alternatively.

23. The key pad assembly according to claim 12, wherein one side and two corners of the carrier are each provided with a notch thereon.

24. The key pad assembly according to claim 23, wherein the notch is provided therein with a stepped light-refracting portion.

25. The key pad assembly according to claim 12, wherein the elastic body is made of a soft PC material.

26. The key pad assembly according to claim 12, wherein the keycap is made of materials having a light-transmitting effect.

27. The key pad assembly according to claim 12, wherein a bottom of the keycap is provided with an adhesive layer, and the adhesive layer allows the keycap to be adhered on the light-shielding layer.

28. The key pad assembly according to claim 12, further comprising a light-emitting element disposed at one side of the second elastic layer.

29. The key pad assembly according to claim 12, further comprising a light-shielding piece disposed above the light-emitting element and the second elastic layer.

* * * * *